US011861631B1

(12) United States Patent
Lange et al.

(10) Patent No.: US 11,861,631 B1
(45) Date of Patent: *Jan. 2, 2024

(54) THIRD PARTY EMAIL PARSING

(71) Applicant: MFTB Holdco, Inc., Seattle, WA (US)

(72) Inventors: Alexander L. Lange, Woodinville, WA (US); Rebekah T. Boydston, Redmond, WA (US)

(73) Assignee: MFTB Holdco, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,542

(22) Filed: Feb. 15, 2023

Related U.S. Application Data

(63) Continuation of application No. 17/027,356, filed on Sep. 21, 2020, now Pat. No. 11,610,212, which is a continuation of application No. 14/060,380, filed on Oct. 22, 2013, now Pat. No. 10,783,530.

(51) Int. Cl.
  *G06Q 30/0201*     (2023.01)
  *G06Q 50/16*       (2012.01)
(52) U.S. Cl.
  CPC ......... *G06Q 30/0201* (2013.01); *G06Q 50/16* (2013.01)
(58) Field of Classification Search
  CPC .................... G06Q 50/16; G06Q 30/0201
  USPC ................................ 705/7.29, 313
  See application file for complete search history.

(56) References Cited

U.S. PATENT DOCUMENTS

| 6,779,021 B1 * | 8/2004 | Bates ............... G06Q 10/107 709/206 |
| 2004/0189699 A1 * | 9/2004 | Dobronsky .......... G06Q 10/107 715/751 |
| 2011/0239160 A1 * | 9/2011 | Kirshenboim ......... G06Q 10/02 715/810 |

OTHER PUBLICATIONS

Most Home Corp., Most Home Technologies Corp. Announces New Lead Management Platform for Real Estate Brokers, Business Wire, May 10, 2005 (Year: 2005).*

* cited by examiner

*Primary Examiner* — Charles Guiliano
(74) *Attorney, Agent, or Firm* — Perkins Coie LLP

(57) ABSTRACT

A system for third party email parsing comprises an input interface and a processor. The input interface is configured to receive an email. The processor is configured to: 1) determine whether the email is from a lead generating system; and 2) in the event that the email is from a lead generating system: a) extract real estate lead information from the email based at least in part on the lead generating system; b) determine whether the real estate lead information is sufficient for a real estate related customer relations management database entry; and c) in the event that the real estate lead information is sufficient for a real estate related customer relations management database entry, add the real estate lead information to a real estate related customer relations management database.

20 Claims, 6 Drawing Sheets

THIRD PARTY EMAIL PARSING

CROSS-REFERENCE TO RELATED APPLICATIONS

This application is a continuation of U.S. patent application Ser. No. 17/027,356, filed on Sep. 21, 2020, entitled "THIRD PARTY EMAIL PARSING," which is a continuation of U.S. patent application Ser. No. 14/060,380, filed on Oct. 22, 2013 (now U.S. Pat. No. 10,783,530), entitled "THIRD PARTY EMAIL PARSING," which are both hereby incorporated by reference in their entireties.

BACKGROUND

There are numerous providers of real estate leads (e.g., leads toward a real estate sale). It is advantageous to be able to accept leads from as many providers as possible, however, the providers have not agreed on an API or standardized format for distributing the leads. At a minimum, each provider distributes leads via email in its own custom format.

BRIEF DESCRIPTION OF THE DRAWINGS

Various embodiments of the invention are disclosed in the following detailed description and the accompanying drawings.

DETAILED DESCRIPTION

Figure 1:
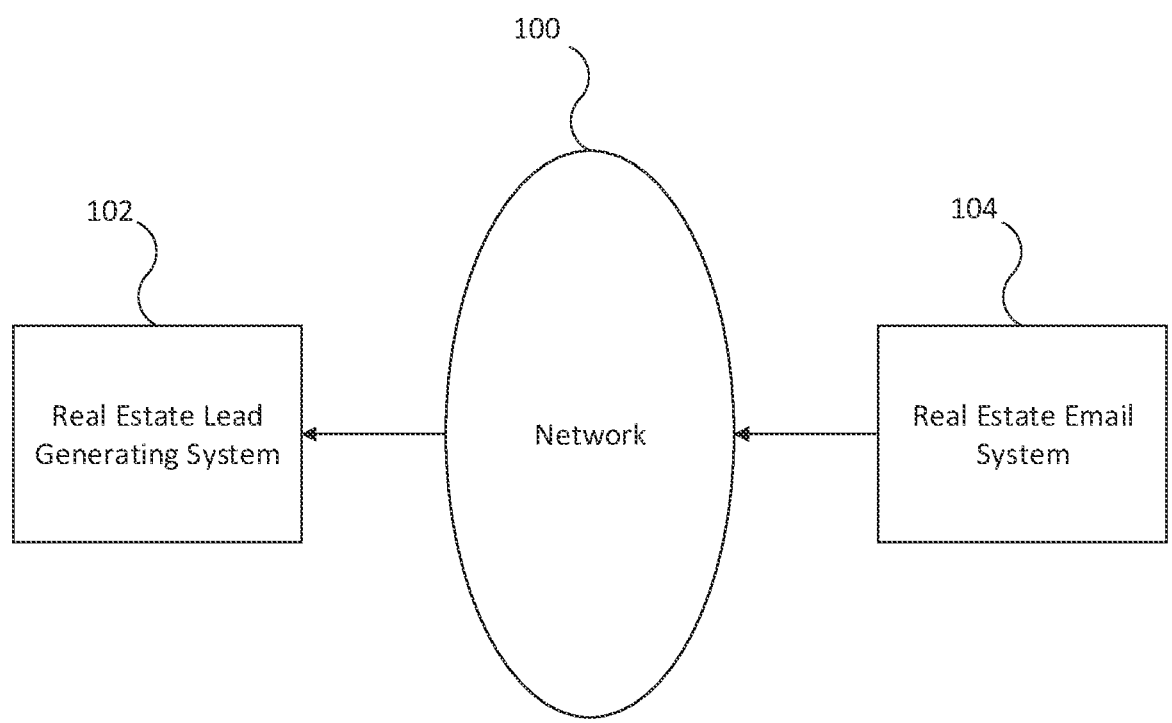
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Third party email parsing is disclosed. A system for third party email parsing comprises an input interface configured to receive an email. The system for third party email parsing additionally comprises a processor configured to determine whether the email is from a lead generating system, and in the event that the email is from a lead generating system, extract real estate lead information from the email based at least in part on the lead generating system. The processor is additionally configured to determine whether the real estate lead information is sufficient for a real estate related customer relations management database entry, and in the event that the real estate lead information is sufficient for a real estate related customer relations management database entry, to add the real estate lead information to a real estate related customer relations management database. The system for third party email parsing additionally comprises a memory coupled to the processor and configured to provide the processor with instructions.

In some embodiments, when an email is received by a real estate email parsing system, the real estate email parsing system determines if the email matches a pattern of a real estate lead provider. In some embodiments, the real estate parsing system compares the email with each of a set of real estate lead provider templates to determine if the email matches any of the templates. If the email is determined to match one of the templates, real estate lead information (e.g., buying/selling/renting, customer name, customer phone number, customer email, property type, price information, etc.) is extracted from the email and inserted as a new lead entry in a real estate customer relations management database. If the real estate lead information is not sufficient (e.g., a required piece of information is missing), the email is added to an email queue (e.g., an in box, a lead with problem box, a default queue, etc.) with a comment added indicating the reason the real estate lead information is not sufficient. If the email does not match a real estate lead provider template, the email is added to an email queue (e.g., an in box, a non-lead box, a default queue) with no modification. The system for third party email parsing additionally includes functionality to detect when a real estate template needs to be modified (e.g., when a real estate lead provider has modified its typical email pattern). In the event that the templates need modification, an indication is generated and sent. The real estate customer receives the email in their email box without the indicator that the lead is shown in their CRM.

FIG. 1 is a block diagram illustrating an embodiment of a network system. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. Real estate lead generating system 102 comprises a system for generating real estate leads. In some embodiments, a real estate lead comprises a lead on a real estate transaction—for example, name and contact information describing a prospective real estate buyer along with a description of the real estate they are interested in buying. In some embodiments, a system for generating leads comprises a system for collecting and distributing lead information. In various embodiments, a system for generating leads comprises a real estate website (e.g., a website designed specifically to assist in the buying and selling of real estate), a message board website (e.g., a website where prospective real estate sellers can post their properties for sale and prospective real estate buyers can view the properties available), a real estate lead office (e.g., an organization for collecting and distributing real estate leads), or any other appropriate system for generating leads. In some embodiments, real estate lead generating system 102 distributes leads via network 100. In various embodiments, real estate lead generating system 102 distributes leads in one or more of: email, on a custom web site, on a public web site, via a custom application programming interface (e.g., API), or any other appropriate lead distribution method. In various embodiments, the network system of FIG. 1 comprises 1, 2, 4, 7, 19, or any other appropriate number of real estate lead generating systems. In some embodiments, different lead generating systems distribute leads using different distribution methods. In some embodiments, different lead generating systems distribute leads using differently formatted emails. Real estate email system 104 comprises a system for receiving real estate emails. In some embodiments, real estate email system 104 comprises an email system fora real estate agent (e.g., an agent for selling real estate). In some embodiments, real estate email system 104 comprises a system for third party email parsing. In some embodiments, real estate email system 104 comprises a system for determining that an email comprises a real estate lead, extracting real estate lead information from the email, and storing the real estate lead information in a database. In various embodiments, real estate email system 104 comprises a computer, a computer with multiple processors, multiple computers connected via a local network, multiple computers connected via a wide area network, multiple computers connected via the Internet, multiple computers connected via network 100, or any other appropriate computing system or systems. In various embodiments, the processors comprising real estate email system 104 comprise any one of a variety of proprietary or commercially available single or multi-processor systems (e.g., an Intel™-based processor) or other type of commercially available processor able to support communications in accordance with each particular embodiment and application.

Figure 2:
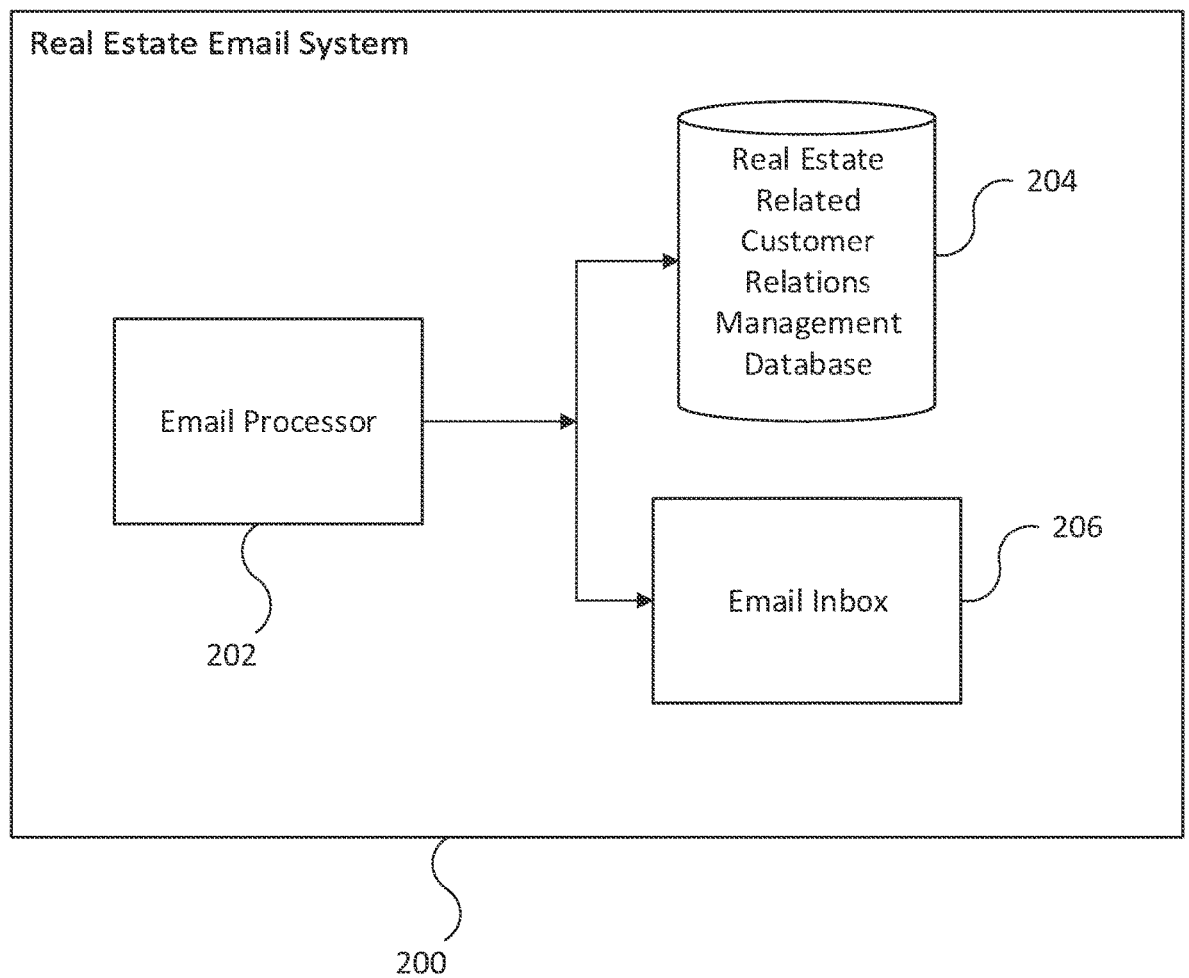
FIG. 2 is a block diagram illustrating an embodiment of a real estate email system.

FIG. 2 is a block diagram illustrating an embodiment of a real estate email system. In some embodiments, real estate email system 200 comprises real estate email system 104 of FIG. 1. In some embodiments, real estate email system 200 comprises a system for third party email parsing. In some embodiments, real estate email system 200 is used by a real estate agent for receiving email. When an email is received by real estate email system 200, it is analyzed (e.g., by email processor 202), and if it is determined not to be a lead, it is delivered to an email queue (e.g., email inbox 206), If the email is determined to be a lead, lead information is extracted from the email and stored in a database (e.g., real estate customer relations management database 204).

Email processor 202 comprises a system for analyzing and processing email. In some embodiments, email processor 202 comprises a system for determining if an email comprises a lead. Email processor 202 comprises a set of templates for determining if an email comprises a lead. In some embodiments, a template comprises a pattern associated with a lead email of a real estate lead generating system (e.g., real estate lead generating system 102 of FIG. 1). In some embodiments, email processor 202 comprises one or more templates for each real estate lead generating system (e.g., each real estate lead generating system 102 of FIG. 1). In some embodiments, a template comprises one or more regular expressions. In some embodiments, a template comprises fixed entries for text that is common to all lead emails matched by the template and variable entries for lead data included in the lead email. In some embodiments, email processor 202 compares each received email with each template in order to determine if the email matches any template. If an email matches a template, email processor 202 determines that the email is sent from the lead generation service associated with the template. In some embodiments, email processor 202 additionally uses email metadata (e.g., email sender address, email routing information, etc.) to determine if an email is sent from a lead generation service. If an email matches a template, email processor 202 additionally extracts lead information from the email using the template. Real estate customer relations management database 204 comprises a customer relations management (e.g., CRM) database for managing real estate customers. In some embodiments, a real estate agent enters leads into real estate related customer relations management database 204 and uses real estate customer relations management database 204 to assist in matching real estate buyers and real estate sellers. Lead information extracted by email processor 202 from an email using a template is automatically stored in real estate customer relations management database 204.

Figure 3:
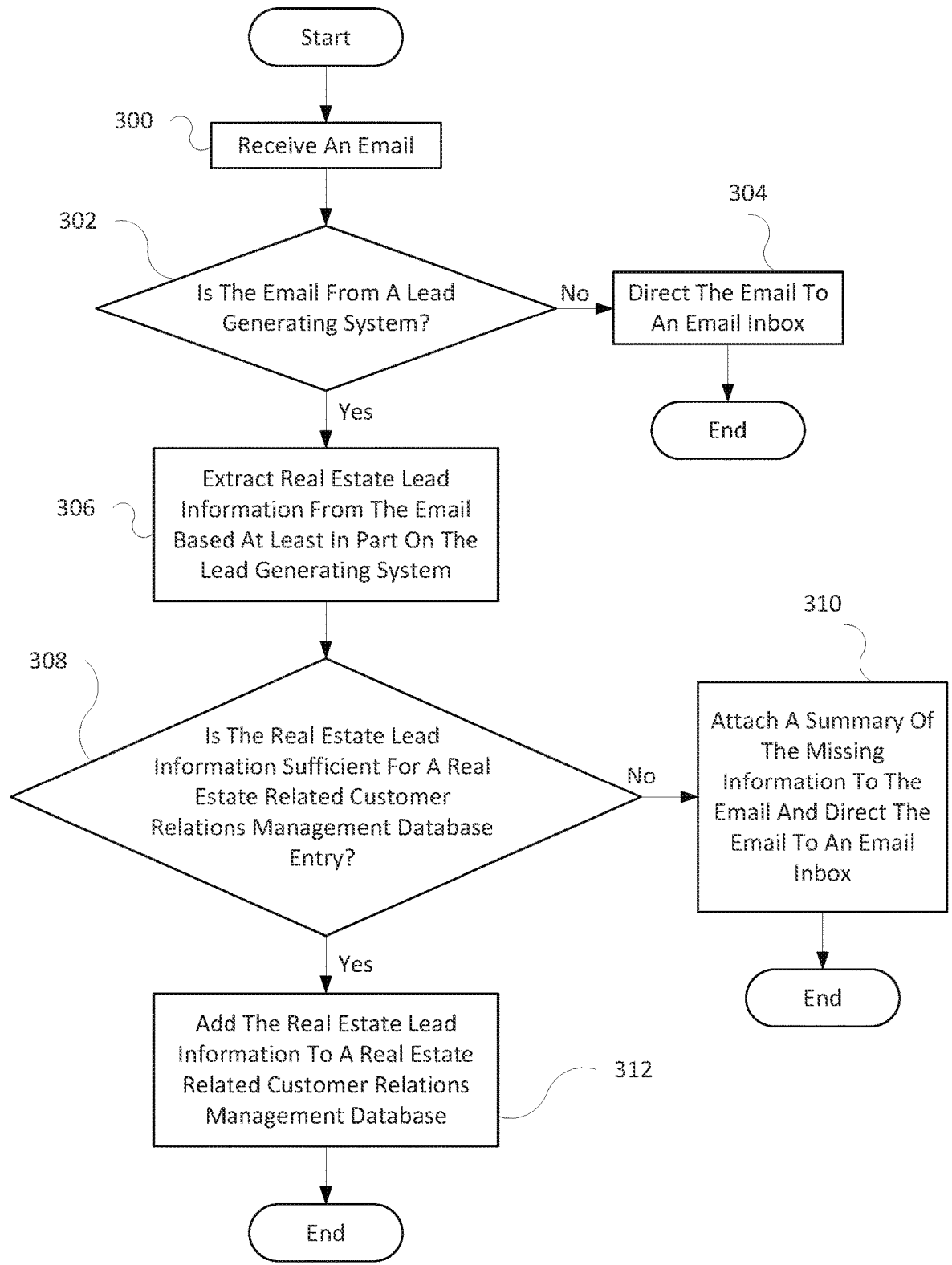
FIG. 3 is a flow diagram illustrating an embodiment of a process for third party email parsing.

FIG. 3 is a flow diagram illustrating an embodiment of a process for third party email parsing. In some embodiments, the process of FIG. 3 is executed by email processor 202 of FIG. 2. In the example shown, in 300, an email is received. In some embodiments, an email is received via a network (e.g., network 100 of FIG. 1). In 302, it is determined if the email is from a lead generating system (e.g., lead generating system 102 of FIG. 1). The lead generating system is identified by the sender information (e.g., 'from' information) contained in the email header. If it is determined that the email is not from a lead generating system, control passes to 304. In 304, the email is directed to an email inbox (e.g., email inbox 206 of FIG. 2), and the process ends. If it is determined in 302 that the email is from a lead generating system, control passes to 306. In 306, real estate lead information is extracted from the email based at least in part on the lead generating system. In some embodiments, real estate lead information is extracted from the email using a template, where the template is associated with the lead generation system. In some embodiments, real estate lead information is extracted from the email using regular expressions. An email body can extract an email with an expression like: <br/{0,1}>Email: ([^<\r\n]*). In 308, it is determined whether the lead information is sufficient for a real estate related customer relations management database entry. For example, the system must be able to extract a lead's email address or phone number to be considered sufficient. In some embodiments, lead information is sufficient for a real estate related customer relations management database entry if data is present for required lead fields (e.g., name, phone number, address, buying/selling, etc.). If it is determined that lead information is not sufficient for a real estate related customer relations management database entry, control passes to 310. In 310, a summary of the missing information is attached to the email and the email is directed to an email inbox, and the process ends. In some embodiments, if it is determined that lead information is not sufficient for a real estate related customer relations management database entry, an incomplete real estate related customer relations management database entry is created and stored in the real estate related customer relations management database. In various embodiments, missing entries in the real estate related customer relations management database entry are left empty, are filled in with placeholder data, are filled in with data extracted from other fields, or are treated in any other appropriate way. If it is determined in 308 that lead information is sufficient for a real estate related customer relations management entry, control passes to 312. In 312, the real estate lead information is added to a real estate related customer relations management database, and the process ends. In some embodiments, adding the real estate lead information to a real estate related customer relations management database comprises creating a new contact in the real estate related customer relations management database. In some embodiments, adding the real estate lead information to a real estate related customer relations management database comprises adding an indication to the contact that a welcome email or emails should not be sent. In some embodiments, when a contact is manually added to a real estate related customer relations management database, one or more welcome emails are sent to the contact to introduce them to the real estate agent.

Figure 4:
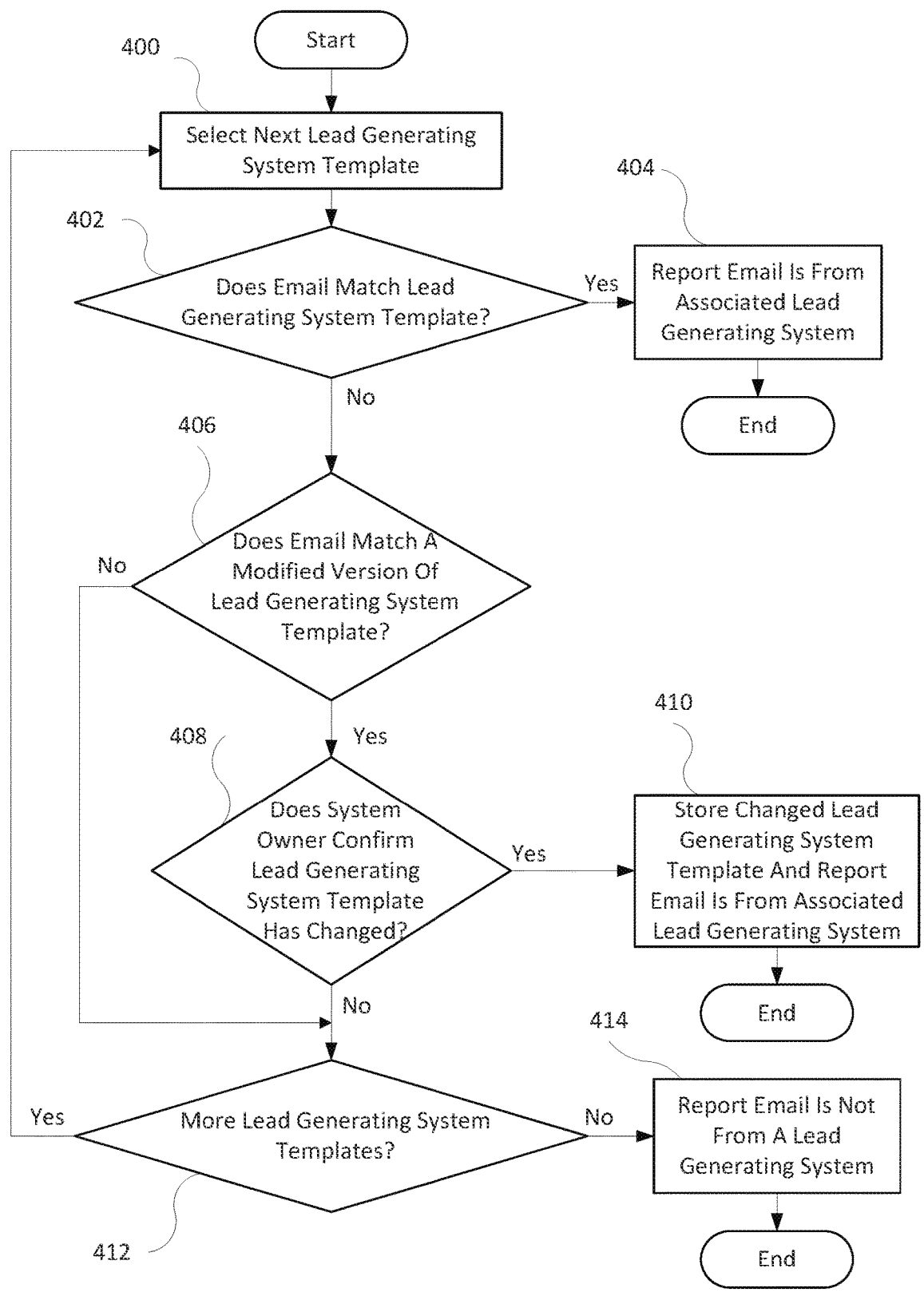
FIG. 4 is a flow diagram illustrating an embodiment of a process for determining if an email is from a lead generating system.

FIG. 4 is a flow diagram illustrating an embodiment of a process for determining if an email is from a lead generating system. In some embodiments, the process of FIG. 4 implements 302 of FIG. 3. In the example shown, in 400, the next lead generating system template is selected. In some embodiments, the next lead generating system template comprises the first lead generating system template. In some embodiments, a lead generating system template comprises metadata describing an email format. In some embodiments, a lead generating system template comprises one or more regular expressions. In 402, it is determined whether the email matches the lead generating system template—i.e., if it matches the email pattern described by the template. If it is determined that the email matches the lead generating system template, control passes to 404. In 404, the process reports that the email is from the associated lead generating system (e.g., the lead generating system associated with the lead generating system template), and the process ends. If it is determined in 402 that the email does not match the lead generating system template, control passes to 406. In 406, it is determined whether the email matches a modified version of the lead generating system template. In various embodiments, a modified version of the lead generating system template comprises a modified version of the template fixed text, modified locations of variable entries for lead data, modified lead data formatting, or any other appropriate modification. For example, for a single lead generating system, a lead's contact information (e.g., phone or email address) may be provided in the subject or the body of an email. In this case, two templates to extract the contact information from the email are needed. If it is determined that the email does not match a modified version of the lead generating system template, control passes to 412. If it is determined that the email does match a modified version of the lead generating system template, control passes to 408. In 408, it is determined whether the system owner confirms that the lead generating system template has changed. In some embodiments, determining whether the system owner confirms that the lead generating system template has changed comprises displaying the email with an indication of the parsing performed by the modified template to the system owner and waiting for an indication of confirmation. If the system owner does not confirm that the template has changed (e.g., the changes determined are incorrect or unwanted), control passes to 412. If the system owner confirms that the lead generating system template has changed, control passes to 410. In 410, the changed lead generating system template is stored (e.g., as the new lead generating system template associated with the lead generating system) and the process reports that the email is from the associated lead generating system, and the process ends.

In 412, it is determined whether there are more lead generating system templates. If it is determined that there are more lead generating system templates, control passes to 400. If it is determined that there are not more lead generating system templates, control passes to 414. In 414, the process reports that the email is not from a lead generating system, and the process ends.

Figure 5:
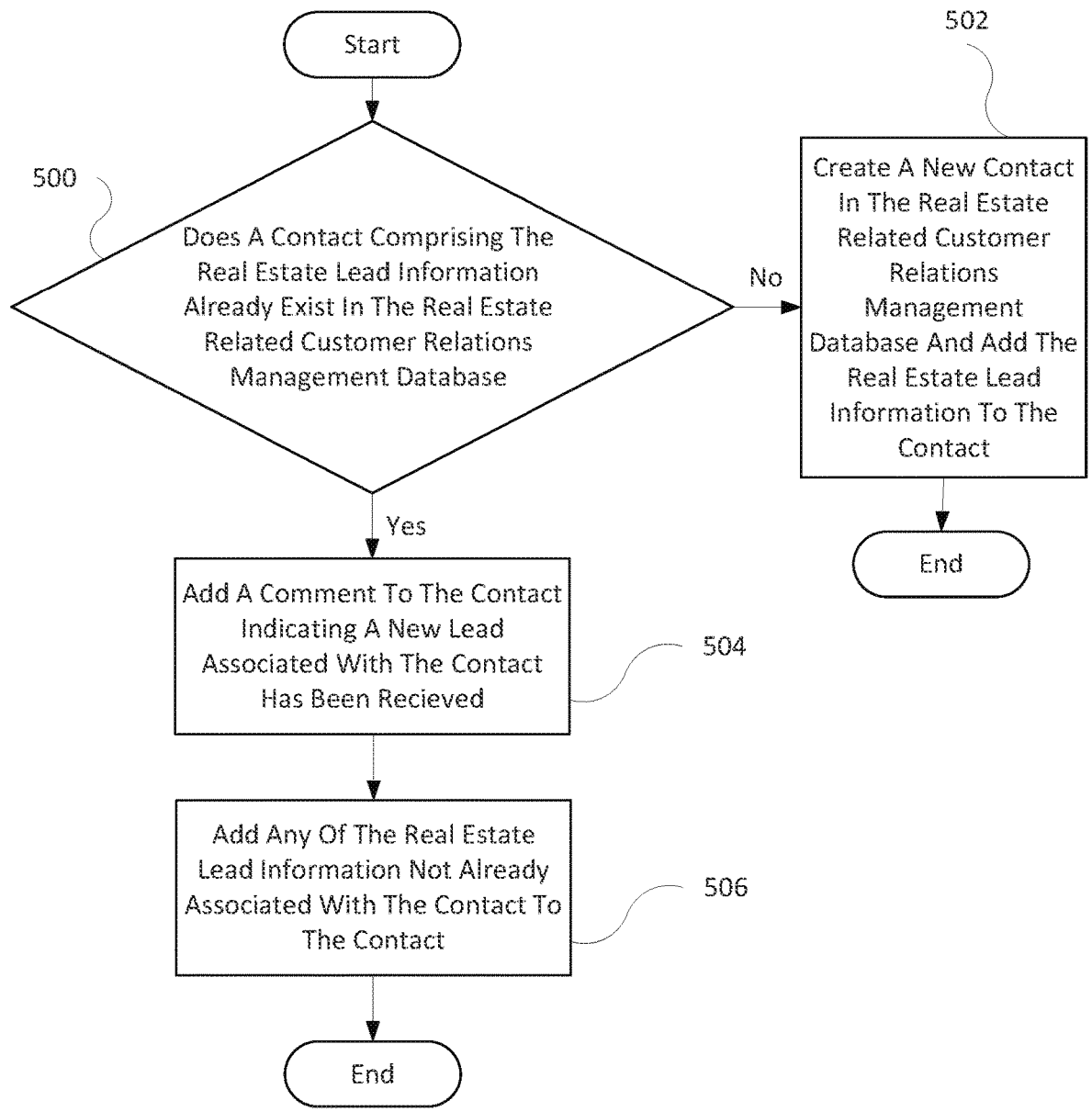
FIG. 5 is a flow diagram illustrating an embodiment of a process for adding real estate lead information to a real estate related customer relations management database.

FIG. 5 is a flow diagram illustrating an embodiment of a process for adding real estate lead information to a real estate related customer relations management database. In some embodiments, the process of FIG. 5 implements 312 of FIG. 3. In the example shown, in 500, it is determined if a contact comprising the real estate lead information already exists in the real estate related customer relations management database. In the event that a contact comprising the real estate lead information does not already exist in the real estate related customer relations management database, control passes to 502. In 502, a new contact is created in the real estate related customer relations management database, and the real estate lead information is added to the contact, and the process ends. In the event it is determined in 500 that a contact comprising the real estate lead information already exists in the real estate related customer relations management database, control passes to 504. In 504, a comment is added to the contact indicating that a new lead associated with the contact has been received. In 506, any of the real estate lead information not already associated with the contact is added to the contact. For example, a comparison is made between the already stored information in the database and the newly input information. In the event that the newly input information is not present in the database, it is input into the database. In the event that the newly input information is present, it is determined which information should be stored in the database (e.g., select the previously stored information, select the newly input information, select a mixture of new and previously stored information, etc.). In various embodiments, the determination of which information to store is based on one or more of the following: a date associated with the information, a type associated with the information, or any other appropriate information.

Figure 6:
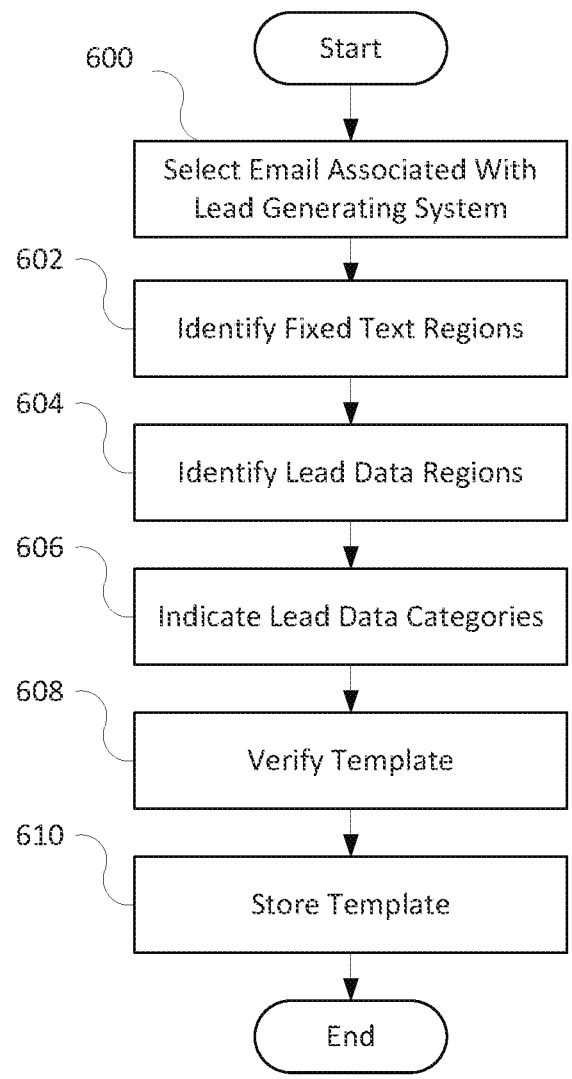
FIG. 6 is a flow diagram illustrating an embodiment of a process for creating a new lead generating system template (e.g., a new lead generating system template associated with a lead generating system).

FIG. 6 is a flow diagram illustrating an embodiment of a process for creating a new lead generating system template (e.g., a new lead generating system template associated with a lead generating system). In some embodiments, the process of FIG. 6 is executed by a real estate email system user (e.g., a user of real estate email system 200 of FIG. 2). In some embodiments, the process of FIG. 6 is used to create a lead generating system template associated with a new lead generating system. In some embodiments, the process of FIG. 6 is used to create a lead generating system template in response to a lead generating system changing its email format. In the example shown, in 600, an email associated with the lead generating system is selected. In 602, fixed text regions (e.g., regions of text that are common to all emails from the lead generating system) are identified. In 604, lead data regions (e.g., regions of text comprising lead data) are identified. In 606, lead data categories are indicated (e.g., which lead data region indicates name, which lead data region indicates phone number, etc.). In 608, the template is verified. In some embodiments, the template is verified by selecting one or more emails associated with the lead generating system and verifying that the lead generating system template identifies the lead data accurately. In 610, the template is stored. For example, an example stored template is:

Source: ActiveRain
From: lead@activerain.com
Subject: <br/{0,1}>Email: ([^<\r\n]*)
Body: <br/{0,1}>Message: ([^<]*)
Phone: <br/{0,1}>Phone Number: ([r\n<r)
Email: <p>From: (nr\n<r)]

In some embodiments, if the lead notification email is from a supported third party lead provider and is in a recognized email header/body format, the email processor shall parse the email for required contact information. This information shall be used to create a lead in the CRM. The parsed information must include contact name and contact email. Leads created from a parsed lead notification email shall be created with the following details shown in the CRM: Status="New"; SourceCode=<Third Party Name>; Email From Contact: Should include the Lead Notification email; Contact History Record: "Contact created from a third party email source." Leads that are parsed from a Lead Notification Email that are NOT new shall have the following details added: Contact History Record: "Existing contact supplied by a third party email source."

In some embodiments, the system shall support a specific lead generating system's new contact email (e.g., a new contact email from a lead generating system of Zillow™'s). For example, the lead generating system is associated with a company called 'LEAD COMPANY.' The email format supported includes the following characteristics:

From: no-reply@email.LEAD COMPANY.com;
Subject: <contact name>sent you a message;
Body:
New Contact
<Contact Name>(<contact email>) is contacting you about a property on Zillow:
<body of email—prospect designated>You can reach me at <phone>
Please beware of scams: Zillow does not review or screen messages sent to your profile. etc. . . . .

This feature shall be made available to any customer that has an active CRM product. A Consumer Website is not required to make use of this feature. Support is Provided for additional lead generating systems. In some embodiments, the lead generating systems comprise Third Party Lead Providers—for example, Trulia™; Realtor.com™ HomeGain™; Homes.com™; ReMax/LeadStreet™; Point2™; A la Mode™; Wolfnet™; and Z57™.

For leads inserted from third party contacts, the following automated emails should not be sent: Welcome Email; Initial Contact Wizard; Listing Campaign Sign-up (e.g., Stagger Emails). In various embodiments, in the event that it is reported that the email is from a lead generating system or that the email is from a lead generating system, indicate that a person or system associated with the email (e.g., sender, associated contact, etc.) is not to receive a welcome email or other routine automated response(s), not to receive update emails after being automatically signed up for a mailing list, is not to be signed up for a mailing list, or not receive any other appropriate emails or notifications. Leads from third party email sources shall be available under Site Activity: Group: Personal Marketing; Sub Group: Leads; Source Code: <Third Party Name>. The email from the third party provider shall be put in webmail—even if the email is not able to be parsed successfully to create a contact. Successfully Parsed emails go to "ShownInCRM" folder. Unsuccessfully parsed emails go to "INBOX" folder.

If the third party provider provides only a first name (e.g., a name without spaces), the contact by is inserted by placing the provided name in the First Name field and a "." for the last name. If the third party provider provides only an email, the contact is inserted by placing the first part of the email name in the First Name field and a "." for the last name. In some embodiments, in the event that the first or last name is not received, a replacement character or combination of characters is stored in the database for the missing first or last name (e.g., a '.', a '..', a '-.-', etc.). In some embodiments, in the event that no name is provided but an email address is provided, then the received email address or a portion of the email address is stored in the database for the first or last name and the other name is filled with a replacement character or a combination of characters.

In some embodiments, the system for third party email parsing comprises insertion of 3rd party leads into user's CRM account via email lead notice from 3rd party, including the ability to:

1) Receive an email on behalf of an agent;
2) Parse the relevant lead information if provided (e.g., Name, phone, email, physical address, multiple listing service identifier (MLS ID));
3) Create a new contact for the agent in her CRM account;
4) Mark the new contact with Status=New and Source=<3rd Party Provider>; and
5) Associate the incoming 3rd party email notification with the new contact for the agent's future reference.

For these leads, the standard automated emails should be suspended:

1) Welcome Email;
2) ICW (e.g., Initial Contact Wizard); and
3) Listing Campaign Sign-up (e.g., Stagger Emails).

Upon receiving a new lead the agent, if registered for profile alerts, should receive an email and/or text alert. This alert should indicate the lead is from a 3rd party.

If the email parsing for an individual email fails, ability to:

1) Generate profile alert to notify agent of failure;
2) Create a notification within CRM (e.g., Reminder); and
3) Provide ability for agent to access email notification from 3rd party provider.

In some embodiments, in the event that extracting real estate lead information from the email fails, a profile alert is generated to notify a failure to extract information from the email. In some embodiments, in the event that extracting real estate lead information from the email fails, a notification is created within the real estate related customer relations management database. In some embodiments, in the event that extracting real estate lead information form the email fails, access is provided to the email from the lead generating system.

The source for the lead should be the name of the 3rd party.

1) This should be the source shown on the Contact detail page;
2) This should be the source that shows in the Source column on Contacts lists; and 3) The user should be able to search by this source in Advanced Search.

Within a CRM, reporting on leads from 3rd party providers is provided. In a CRM user interface (UI), each 3rd party source is placed under a separate entry for Site Activity>Personal Marketing. In some embodiments, Site Activity is only available for Site Owners, Business Suite agents would not have access to this data until reporting is made available to them.

Within the CRM, the following features are visible (e.g., some location in Admin). A user or agent is aware of:
1) How to setup the feature
2) What 3rd parties are supported
3) How to request a new 3rd party support In some embodiments, a detailed set of instructions is established within the Help menu.

In some embodiments, lead follow-up is facilitated by providing a default email template for user to select and use when sending a first email response to the third party referred user. For example:
1) Re-label Action "Resend Welcome Email" to "Welcome Email" (1)
2) Allow user to edit default copy (not password section) at time of sending Welcome Email (1)
3) Allow user to define default Welcome Email copy for 3rd Party leads (2)

In some embodiments, the template is defined for multiple $3^{rd}$ parties. In some embodiments, each $3^{rd}$ party source has a corresponding template for a return email.

In some embodiments, reporting is provided based at least in part on the emails from $3^{rd}$ party lead generating systems that are processed. In various embodiments, the emails are processed for the reports to determine: 1) which customers are receiving 3rd party leads and how many are they receiving on a daily, weekly, monthly basis; 2) whether there are 3rd parties making inroads with particular franchises/companies; and 3) whether there are any lead flow patterns for 3rd parties (e.g., Zillow leads spike on Saturdays, Trulia spikes on Tuesday, etc.). In some embodiments, the following data elements are gathered or sent to a central server in order to generate reports: 1) Customer; 2) Franchise; 3) Company name; 4) Lead Source; and 5) Lead Count.

In some embodiments, defensive measures protect against email spam. For example, if a lead's contact email is known to be on a spam watch black list, the lead is not created.

In some embodiments, the system automatically monitors to detect a spike in lead insert failures from a particular source and indicates the spike to an administrator. In some embodiments, the system automatically monitors to detect a spike in lead insert failures from a particular source and searches the email body to determine a new format.

Although the foregoing embodiments have been described in some detail for purposes of clarity of understanding, the invention is not limited to the details provided. There are many alternative ways of implementing the invention. The disclosed embodiments are illustrative and not restrictive.

We claim:

1. A system for parsing unstandardized emails generated by disparate third party systems, the system comprising:
at least one processor;
at least one memory coupled to the at least one processor and storing instructions that, when executed by the at least one processor, perform operations comprising:
receiving, via a wide area network, one or more emails from one or more computing systems remote from the system;
identifying, from the one or more emails, an email associated with a lead generating system based on (1) lead information in contents of the email, and/or (2) sender information, both associated with the lead generating system;
determining that the identified email does not match at least one template in a set of templates associated with the lead generating system;
when the identified email does not match any template in the set of templates associated with the lead generating system, request confirmation, from a user of the lead generating system, that at least one previously stored template in the set templates associated with the lead generating system has changed;
in response to receiving the confirmation that the at least one previously stored template has changed, modify the at least one previously stored template to generate a modified version of the at least one previously stored template in the set templates associated with the lead generating system;
determining that the identified email matches the modified version of the at least one previously stored template by:
identifying one or more regions of the identified email that are common to a set of previously received emails from the lead generating system; and
verifying that the modified version of the at least one previously stored template applies to the lead generating system by applying the modified version of the at least one previously stored template to the set of previously received emails from the lead generating system,
wherein the set of previously received emails are different from the identified email, and
wherein applying the modified version of the at least one previously stored template to the set of previously received emails comprises:
applying one or more regular expressions, from the modified version of the at least one previously stored template, to a subject, body, metadata, and/or contents associated with the set of previously received emails.

2. The system of claim 1, wherein the at least one processor is further configured to:
in response to determining that the email matches the previously stored modified version of the at least one template in the set of templates associated with the lead generating system:
extracting real estate lead information from the email based at least in part on a particular mapping, in a mapping of real estate lead generating system templates to lead generating systems, that references the lead generating system;
determining that the extracted real estate lead information is not sufficient for a real estate related customer relations management database entry; and
in response to the determination that the extracted real estate lead information is not sufficient for the real estate related customer relations management database entry, adding the email to an email queue with an indication that the extracted real estate lead information is not sufficient for the real estate related customer relations management database entry.

3. The system of claim 1, wherein the at least one processor is further configured to:

in response to determining that the email matches the previously stored modified version of the at least one template in the set of templates associated with the lead generating system:
- extracting real estate lead information from the email based at least in part on a particular mapping, in a mapping of real estate lead generating system templates to lead generating systems, that references the lead generating system;
- determining that the extracted real estate lead information is sufficient for a database entry of a real estate related customer relations management system; and
- in response to the determination that the extracted real estate lead information is sufficient for the real estate related customer relations management database entry, adding the extracted real estate lead information to a database of the real estate related customer relations management database system.

4. The system of claim 1, wherein the at least one template in the set of templates associated with the lead generating system comprises: metadata describing an email format, one or more second regular expressions, or any combination thereof.

5. The system of claim 1, wherein the modified version of the at least one template comprises: a modified version of template fixed text, modified locations of variable entries for lead data, modified lead data formatting, or any combination thereof.

6. A computer-implemented method for parsing unstandardized emails generated by disparate third party systems, the method comprising:
- receiving, via a wide area network, one or more emails from one or more computing systems remote from the system;
- identifying, from the one or more emails, an email associated with a lead generating system based on (1) lead information in contents of the email, and/or (2) sender information, both associated with the lead generating system;
- determining that the identified email does not match at least one template in a set of templates associated with the lead generating system;
- when the identified email does not match any template in the set of templates associated with the lead generating system, request confirmation, from a user of the lead generating system, that at least one previously stored template in the set templates associated with the lead generating system has changed;
- in response to receiving the confirmation that the at least one previously stored template has changed, modify the at least one previously stored template to generate a modified version of the at least one previously stored template in the set templates associated with the lead generating system;
- determining that the identified email matches the modified version of the at least one previously stored template by:
  - identifying one or more regions of the identified email that are common to a set of previously received emails from the lead generating system; and
  - verifying that the modified version of the at least one previously stored template applies to the lead generating system by applying the modified version of the at least one previously stored template to the set of previously received emails from the lead generating system,
  - wherein the set of previously received emails are different from the identified email, and
  - wherein applying the modified version of the at least one previously stored template to the set of previously received emails comprises:
    - applying one or more regular expressions, from the modified version of the at least one previously stored template, to a subject, body, metadata, and/or contents associated with the set of previously received emails.

7. The method of claim 6, further comprising:
in response to determining that the email matches the previously stored modified version of the at least one template in the set of templates associated with the lead generating system:
- extracting real estate lead information from the email based at least in part on a particular mapping, in a mapping of real estate lead generating system templates to lead generating systems, that references the lead generating system;
- determining that the extracted real estate lead information is not sufficient for a real estate related customer relations management database entry; and
- in response to the determination that the extracted real estate lead information is not sufficient for the real estate related customer relations management database entry, adding the email to an email queue with an indication that the extracted real estate lead information is not sufficient for the real estate related customer relations management database entry.

8. The method of claim 6, further comprising:
in response to determining that the email matches the previously stored modified version of the at least one template in the set of templates associated with the lead generating system:
- extracting real estate lead information from the email based at least in part on a particular mapping, in a mapping of real estate lead generating system templates to lead generating systems, that references the lead generating system;
- determining that the extracted real estate lead information is sufficient for a database entry of a real estate related customer relations management system; and
- in response to the determination that the extracted real estate lead information is sufficient for the real estate related customer relations management database entry, adding the extracted real estate lead information to a database of the real estate related customer relations management database system.

9. The method of claim 6, wherein the at least one template in the set of templates associated with the lead generating system comprises: metadata describing an email format, one or more second regular expressions, or any combination thereof.

10. The method of claim 6, wherein the modified version of the at least one template comprises: a modified version of template fixed text, modified locations of variable entries for lead data, modified lead data formatting, or any combination thereof.

11. The method of claim 6, further comprising:
determining that an entity associated with the email is not to receive a routine automated response.

12. The method of claim 6, further comprising:
accessing the modified version of the at least one previously stored template from a storage associated with the lead generating system.

13. The method of claim 6, wherein a sequence of words represents (1) the lead information in contents of the email, and/or (2) the sender information in the identified email.

14. One or more non-transitory computer-readable medium comprising instructions that, when executed by one or more processors, cause operations comprising:
- receiving, via a wide area network, one or more emails from one or more computing systems remote from the system;
- identifying, from the one or more emails, an email associated with a lead generating system based on (1) lead information in contents of the email, and/or (2) sender information, both associated with the lead generating system;
- determining that the identified email does not match at least one template in a set of templates associated with the lead generating system;
- when the identified email does not match any template in the set of templates associated with the lead generating system, request confirmation, from a user of the lead generating system, that at least one previously stored template in the set templates associated with the lead generating system has changed;
- in response to receiving the confirmation that the at least one previously stored template has changed, modify the at least one previously stored template to generate a modified version of the at least one previously stored template in the set templates associated with the lead generating system;
- determining that the identified email matches the modified version of the at least one previously stored template by:
  - identifying one or more regions of the identified email that are common to a set of previously received emails from the lead generating system; and
  - verifying that the modified version of the at least one previously stored template applies to the lead generating system by applying the modified version of the at least one previously stored template to the set of previously received emails from the lead generating system,
  - wherein the set of previously received emails are different from the identified email, and
  - wherein applying the modified version of the at least one previously stored template to the set of previously received emails comprises:
    - applying one or more regular expressions, from the modified version of the at least one previously stored template, to a subject, body, metadata, and/or contents associated with the set of previously received emails.

15. The medium of claim 14, the operations further comprising:
- in response to determining that the email matches the previously stored modified version of the at least one template in the set of templates associated with the lead generating system:
  - extracting real estate lead information from the email based at least in part on a particular mapping, in a mapping of real estate lead generating system templates to lead generating systems, that references the lead generating system;
  - determining that the extracted real estate lead information is not sufficient for a real estate related customer relations management database entry; and
  - in response to the determination that the extracted real estate lead information is not sufficient for the real estate related customer relations management database entry, adding the email to an email queue with an indication that the extracted real estate lead information is not sufficient for the real estate related customer relations management database entry.

16. The medium of claim 14, the operations further comprising:
- in response to determining that the email matches the previously stored modified version of the at least one template in the set of templates associated with the lead generating system:
  - extracting real estate lead information from the email based at least in part on a particular mapping, in a mapping of real estate lead generating system templates to lead generating systems, that references the lead generating system;
  - determining that the extracted real estate lead information is sufficient for a database entry of a real estate related customer relations management system; and
  - in response to the determination that the extracted real estate lead information is sufficient for the real estate related customer relations management database entry, adding the extracted real estate lead information to a database of the real estate related customer relations management database system.

17. The medium of claim 14, wherein the at least one template in the set of templates associated with the lead generating system comprises: metadata describing an email format, one or more second regular expressions, or any combination thereof.

18. The medium of claim 14, wherein the modified version of the at least one template comprises: a modified version of template fixed text, modified locations of variable entries for lead data, modified lead data formatting, or any combination thereof.

19. The medium of claim 14, the operations further comprising:
- determining that an entity associated with the email is not to receive a routine automated response.

20. The medium of claim 14, the operations further comprising:
- accessing the modified version of the at least one previously stored template from a storage associated with the lead generating system.

* * * * *